(12) United States Patent  
Hatfield et al.

(10) Patent No.: US 9,395,959 B2  
(45) Date of Patent: Jul. 19, 2016

(54) INTEGRATED WORKFLOW VISUALIZATION AND EDITING

(75) Inventors: L. Tucker Hatfield, Kirkland, WA (US); William Charles Kennedy, Seattle, WA (US); David Charles Wadsworth, Redmond, WA (US); Samuel Chung, Seoul (KR); Jason Frank Morrill, Redmond, WA (US); Soo Youn Cho, Seoul (KR); Seung Wook Son, Seoul (KR); Hoe Jin Kim, Seoul (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 13/316,108

(22) Filed: Dec. 9, 2011

(65) Prior Publication Data

US 2013/0152041 A1    Jun. 13, 2013

(51) Int. Cl.
  *G06F 9/44* (2006.01)
  *G06Q 10/06* (2012.01)

(52) U.S. Cl.
  CPC . *G06F 8/34* (2013.01); *G06Q 10/06* (2013.01)

(58) Field of Classification Search
  USPC .......... 717/101–102, 100, 139; 715/723, 859; 705/1, 7–8; 707/101; 345/179; 719/328
  IPC . G06Q 10/0633,10/0631, 10/06316; G06F 8/34
  See application file for complete search history.

(56) References Cited

U.S. PATENT DOCUMENTS

| | | | |
|---|---|---|---|
| 5,930,512 A * | 7/1999 | Boden et al. | 717/102 |
| 6,381,610 B1 | 4/2002 | Gundewar et al. | |
| 6,985,938 B2 | 1/2006 | Ohsaki et al. | |
| 7,027,997 B1 | 4/2006 | Robinson et al. | |
| 7,403,948 B2 | 7/2008 | Ghoneimy et al. | |
| 7,565,640 B2 | 7/2009 | Shukla et al. | |
| 7,835,932 B2 | 11/2010 | Minsky et al. | |
| 2002/0007300 A1 | 1/2002 | Slatter | |
| 2002/0032596 A1 | 3/2002 | Ohsaki et al. | |
| 2003/0171947 A1 * | 9/2003 | Ledford et al. | 705/1 |
| 2003/0217053 A1 | 11/2003 | Bachman et al. | |

(Continued)

OTHER PUBLICATIONS

Kulkarni, Anand et al., "Turkomatic: Automatic, Recursive Task and Workflow Design for Mechanical Turk", 2011, obtained online on Jul. 25, 2011 at: http://husk.eecs.berkeley.edu/courses/cs298-52-sp11/images/8/8d/FinalPaper-KulkarniCan.pdf, 6 pgs.

(Continued)

*Primary Examiner* — Tuan Vu

(74) *Attorney, Agent, or Firm* — Tom Wong; Julie Kane Akhter; Micky Minhas

(57) ABSTRACT

Integrated workflow visualization and editing is provided using a visual graphic diagramming tool and a web application platform tool to create a workflow. A visual representation of a workflow is created using the visual graphic diagramming tool. A declarative markup language file representing the workflow is provided to a web application platform tool for further modification of the workflow. The workflow is opened in the web application platform tool and desired parameters in the workflow are set. Visualization data from the graphic diagramming tool and the set parameters are bundled in a single declarative markup language file formatted for reading by both the visual graphic diagramming tool and the web application platform tool to allow manipulations and parameterization of the workflow in both the visual graphic diagramming tool and the web application platform tool.

20 Claims, 17 Drawing Sheets

(56) References Cited

U.S. PATENT DOCUMENTS

| | | | |
|---|---|---|---|
| 2004/0078373 A1 | 4/2004 | Ghoneimy et al. | |
| 2004/0083463 A1* | 4/2004 | Hawley | 717/140 |
| 2005/0038764 A1 | 2/2005 | Minsky et al. | |
| 2005/0071803 A1* | 3/2005 | Cherdron et al. | 717/101 |
| 2005/0198021 A1 | 9/2005 | Wilcox et al. | |
| 2006/0007189 A1* | 1/2006 | Gaines et al. | 345/179 |
| 2006/0069605 A1 | 3/2006 | Hatoun | |
| 2006/0074730 A1* | 4/2006 | Shukla et al. | 705/8 |
| 2006/0074735 A1 | 4/2006 | Shukla et al. | |
| 2007/0033088 A1* | 2/2007 | Aigner et al. | 705/9 |
| 2008/0010597 A1* | 1/2008 | Seemann et al. | 715/723 |
| 2008/0115195 A1 | 5/2008 | Malek et al. | |
| 2009/0006154 A1 | 1/2009 | Hao | |
| 2009/0007063 A1 | 1/2009 | Szpak et al. | |
| 2009/0088875 A1 | 4/2009 | Baier et al. | |
| 2009/0089078 A1* | 4/2009 | Bursey | 705/1 |
| 2009/0125359 A1 | 5/2009 | Knapic et al. | |
| 2009/0183063 A1 | 7/2009 | Malkin et al. | |
| 2009/0282067 A1* | 11/2009 | Bendigeri et al. | 707/101 |
| 2010/0070945 A1 | 3/2010 | Tattrie et al. | |
| 2010/0299170 A1 | 11/2010 | Savescu et al. | |
| 2010/0306007 A1 | 12/2010 | Ganapathyraj et al. | |
| 2013/0152021 A1 | 6/2013 | Hatfield et al. | |
| 2013/0152038 A1 | 6/2013 | Lim et al. | |
| 2013/0179208 A1 | 7/2013 | Chung et al. | |

OTHER PUBLICATIONS

"Working with Workflows", docs.day.com, 2011, obtained online on Jul. 25, 2011 at: http://dev.day.com/content/docs/en/cq/5-3/administering/working_with_workflows.html, 22 pgs.

"Introduction to designing and customizing workflows", Microsoft Corporation, 2011, obtained online on Jul. 25, 2011 at: http://office.microsoft.com/en-us/sharepoint-designer-help/introduction-to-designing-and-customizing-workflows-HA101859249.aspx, 24 pgs.

"EPMSource", obtained online on Sep. 7, 2011 at: http://epmsource.com/tag/workflows/, 20 pgs.

Heaney, Steve, "Developing Visual Studio Workflows and Activities for SharePoint Sites", Microsoft Office SharePoint Server 2007, obtained online on Sep. 7, 2011 at: http://live.sharepointcommunity.de/wiki/sharepointconference/DEV07-Developing%20Visual%20Studio%20Workflows%20and%20Activities%20for%20SharePoint%20Sites.pdf, 28 pgs.

"Creating a Branching Workflow for Multiple Stages", obtained online on Sep. 7, 2011 at: http://msdn.microsoft.com/en-us/library/ee767701.aspx, published May 2010, 19 pgs.

Bhatawdekar, Ameya, "Solution Starter: BizTalk Server Workflow", Microsoft Corporation, Dec. 2003, obtained online on Sep. 5, 2011 at: http://msdn.microsoft.com/en-us/library/aa168476(v=office.11).aspx, 9 pgs.

"Java Workflow Tooling (JWT)", The Eclipse Foundation, 2011, obtained online on Sep. 5, 2011 at: http://www.eclipse.org/proposals/jwt/, 11 pgs.

"Build Setup and Workflow Design", PMEase Incorporated, 2009, obtained online on Sep. 5, 2011 at: http://www.pmease.com/features/setup.html, 5 pgs.

U.S. Appl. No. 13/316,256, filed Dec. 9, 2011 entitled: Project Management Workflows.

U.S. Appl. No. 13/316,112, filed Dec. 9, 2011 entitled: Stage and Stage View Within a Workflow.

U.S. Appl. No. 13/316,256, Office Action mailed Oct. 11, 2013, 21 pgs.

U.S. Appl. No. 13/316,256, Amendment and Response filed Jul. 23, 2014, 14 pgs.

U.S. Appl. No. 13/316,256, Office Action mailed Jul. 31, 2014, 5 pgs.

Microsoft Corporation, "Guide for IT Pros for Project Server 2010", Dec. 9, 2010, retrieved from: http://www.rickkhosla.com/uploads/1/5/2/1/1521455/project_server_help.pdf, 757 pgs.

U.S. Appl. No. 13/316,256, Amendment and Response filed Jan. 13, 2014, 14 pgs.

U.S. Appl. No. 13/316,256, Office Action mailed Apr. 23, 2014, 25 pgs.

U.S. Appl. No. 13/316,256, Amendment and Response filed Oct. 31, 2014, 9 pgs.

U.S. Appl. No. 13/316,256, Notice of Allowance mailed Nov. 14, 2014, 9 pgs.

U.S. Appl. No. 13/316,112, Office Action mailed Aug. 13, 2015, 15 pgs.

U.S. Appl. No. 13/316,112, Amendment and Response filed Nov. 24, 2014, 11 pgs.

U.S. Appl. No. 13/316,112, Office Action mailed Dec. 26, 2014, 12 pgs.

U.S. Appl. No. 13/316,112, Amendment and Response filed Mar. 26, 2015, 11 pgs.

U.S. Appl. No. 13/316,112, Amendment and Response filed Nov. 11, 2015, 12 pgs.

U.S. Appl. No. 13/316,112, Office Action mailed Feb. 11, 2016, 17 pgs.

* cited by examiner

| Validation Rules |
| --- |
| Duplicate connections exist between workflow shapes. |
| The connector must be connected to two workflow shapes. |
| The connector is not a valid connector. |
| The workflow shape is not connected to the workflow. |
| The workflow shape is not connected to a terminate shape. |
| The workflow must have a start shape. |
| Diagram must only have one workflow and one start shape. |
| Loop back to parent shape is not allowed within a stage or step. |
| The start shape must not have incoming connections. |
| The terminate shape must not have outgoing connections. |
| Condition shape does not have connections with Yes/No. |
| Workflow nesting levels exceeds maximum. |
| Parallel activities that are also sequential are not allowed. |
| The start shape is not connected to workflow shapes. |
| A stage cannot be nested within any other shapes. |
| A stage can only be connected to another stage, condition shape, or a terminator. |
| A non-stage action shape cannot reference a parent shape. |
| An If/Else condition cannot reference a parent shape if the incoming connection is coming from a non-stage shape. |
| A shape nested within a stage/loop/parallel activity cannot be connected to a shape outside of the start/end path of the current shape's container. |
| Only stage and condition shapes may exist at the base layer. All other shapes must be nested within a Stage shape. |
| Stage/step/loop containers cannot be overlapped. |

Fig. 2

INTEGRATED WORKFLOW VISUALIZATION AND EDITING

CROSS REFERENCE TO RELATED APPLICATIONS

The present application is related to co-pending U.S. patent application Ser. No. 13/316,256 entitled PROJECT MANAGEMENT WORKFLOWS, filed Dec. 9, 2011, and U.S. patent application Ser. No. 13/316,112, entitled STAGE AND STAGE VIEW WITHIN A WORKFLOW, filed Dec. 9, 2011, which are hereby incorporated by reference in their entirety.

BACKGROUND

Workflow creation and editing is an important task to many organizations. Users want to build workflows that get executed using a web application platform. Any graphics software with flow chart shapes can be used to create a workflow diagram. For example, anyone already familiar with flowcharting in Microsoft Visio can design a workflow that represents their business logic. Then, the workflow may be opened in the web application platform using a web application platform tool. One example of a web application platform tool is SharePoint Designer 2010. Using a web application platform tool, the user may then edit parameters to implement the workflow. The workflow built in the graphic diagramming program is not complete enough to run without further modifications made within the web application platform tool.

This process was very code-like and therefore did not provide a close, direct connection between the visualization, i.e., the visual design, and the parameterization. The implementation on the web application platform tool also did not have a lot of features that customers wanted to be able to use. Nevertheless, in creating workflows, the designer always has to use the text base tool feature that allows the designer to go from the graphic diagramming program into the web application platform tool and transition back and forth between the two products. However, while designers had this joint import/export experience, designers were never sure how the final workflow would look. The designer would finish setting the workflow up in the web application platform tool and then publish the workflow onto the server where the workflow could be reviewed.

Thus, the graphic diagramming tool is merely a starting point. The designer had to eventually switch to web application platform tool to implement the code. However, in many cases, the person who is the designer or expert on the workflow process that needs to be automated is not an engineer or expert in declarative editor authoring. Therefore, it is important to enable the process designer to use familiar tools to create a visual workflow in a manner that enables an implementer to easily translate that process design expertise into a functional workflow. Currently, the process of moving a visual workflow from the diagramming program to the web application platform is not a simple task. Moreover, the process may require further modifications because the resulting code provided by the expert in declarative editor authoring does not correlate with workflow envisioned by the process expert.

SUMMARY OF THE INVENTION

To overcome the limitations described above, and to overcome other limitations that are apparent upon reading and understanding the present specification, embodiments for providing integrated workflow visualization and editing are disclosed.

The above described problems are solved by a providing workflow support that creates integrated visualization of logical constructs within workflows that are shared between a visual graphic diagramming tool and a declarative authoring tool. A visualization of elements, such as stages, steps and loops, in both the visual graphic diagramming tool and a declarative authoring tool is provided. The creation of a stage view enables the user to visualize a high order logical flow of the workflow, and provides extendibility to the workflow diagram set.

An embodiment includes a method for providing integrated workflow visualization and editing. The method includes using a visual graphic diagramming tool and a web application platform tool to create a workflow by opening a workflow template in the visual graphic diagramming tool to provide shapes and intelligence used to build a visual representation of the workflow, creating at least one container representing at least one stage of the workflow, and using the at least one stage to create the workflow, providing the workflow to a web application platform using a declarative markup language file for further modification of the workflow, opening the workflow in the web application platform tool and setting desired parameters in the workflow using the web application platform tool, wherein visualization data from the graphic diagramming tool and the set parameters are bundled in a single declarative markup language file formatted for reading by both the visual graphic diagramming tool and the web application platform tool to allow manipulations and parameterization of the workflow in both the visual graphic diagramming tool and the web application platform tool.

In another embodiment, a system for providing integrated workflow visualization and editing is disclosed. The system includes a visual graphic diagramming tool for creating a visual representation of a workflow, wherein a workflow template is opened in the visual graphic diagramming tool to provide shapes and intelligence used to build a visual representation of the workflow, at least one container representing at least one stage of the workflow is created, and the at least one stage is used to produce the workflow and a web application platform tool, operatively coupled to the visual graphic diagramming tool, to modify the workflow created with the visual graphic diagramming tool, the web application platform tool receives the workflow as a declarative markup language file from the visual graphic diagramming tool for further modification of the workflow, opens the workflow and sets desired parameters, wherein visualization data from the graphic diagramming tool and the set parameters are bundled in a single declarative markup language file formatted for reading by both the visual graphic diagramming tool and the web application platform tool to allow manipulations and parameterization of the workflow in both the visual graphic diagramming tool and the web application platform tool.

A computer-readable medium including executable instructions which, when executed by a processor, provides integrated workflow visualization and editing is disclosed. The computer-readable medium includes instructions executable by the processor for using a visual graphic diagramming tool and a web application platform tool to create a workflow by opening a workflow template in the visual graphic diagramming tool to provide shapes and intelligence used to build a visual representation of the workflow, creating at least one container representing at least one stage of the workflow, and using the at least one stage to create the workflow, providing the workflow to a web application platform using a declarative markup language file for further modification of the workflow, opening the workflow in the web application platform tool and setting desired parameters in the workflow using the web application platform tool, wherein visualization data from the graphic diagramming tool and the set parameters are bundled in a single declarative markup language file formatted for reading by both the visual graphic diagramming tool and the web application platform tool to allow manipulations and parameterization of the workflow in both the visual graphic diagramming tool and the web application platform tool.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Referring now to the drawings in which like reference numbers represent corresponding parts throughout:

FIG. 2 lists validation rules for a workflow with stages, loops, and steps according to one embodiment;

DETAILED DESCRIPTION

Embodiments of the present invention provide a workflow solution that includes visualization of logical constructs, such as stages, steps and loops, to enhance the visualization of workflows. The logical flow of the workflow is visualized by the stage view. This may enable the user to easily visualize a workflow as a flow diagram, customizing it to include formatting as well as callouts, legends, or other content to make the flow more self-documenting. The resulting diagram can be used on its own merits as documentation for the process and can be easily sent to the application platform to complete the work necessary to automate the workflow. These diagrams may be created by a business professional familiar with workflow management, but with limited understanding of programming. To make this process more seamless, the application platform designer may incorporate a visual design mode by hosting the diagramming program, with added functionality to allow parameterization.

Figure 1:
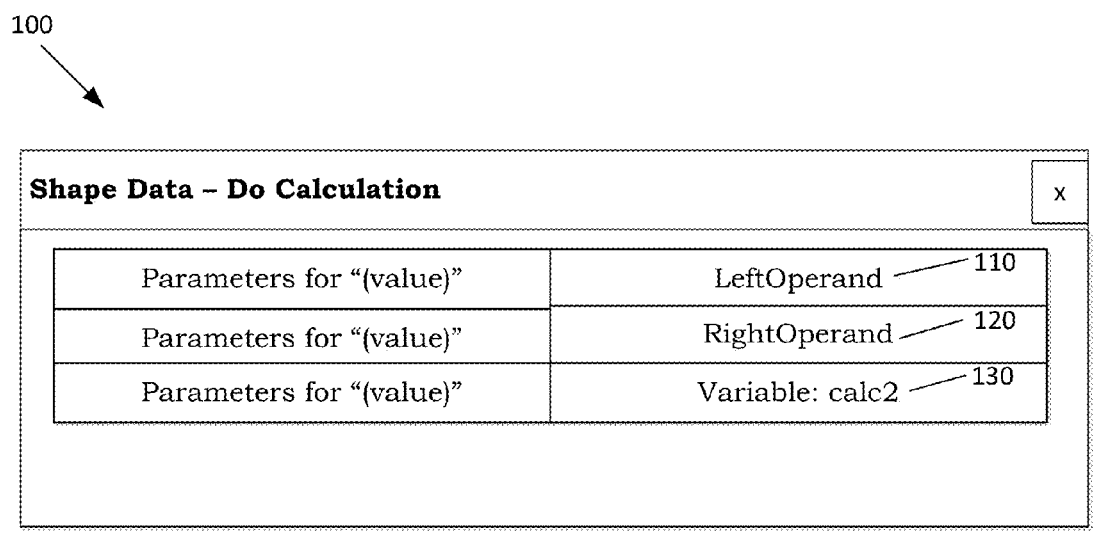
FIG. 1 shows parameters associated with shape data according to one embodiment.

FIG. 1 shows parameters associated with shape data 100 according to one embodiment. In FIG. 1, shape data parameters for a "Do Calculation" action is illustrated. The designer software may read and write workflow declarative markup language (DML) fragments to the User Cell contained within each shape. Visible user interface (UI) elements may be created in a declarative markup language, such as Extensible Application Markup Language (XAML), and then the UI definition can be separated from the run-time logic by using code-behind files, joined to the markup through partial class definitions. The Extensible Application Markup Language is a declarative Extensible Markup Language-based language. A declarative markup language, such as XAML, enables a workflow where separate parties can work on the UI and the logic of an application, using potentially different tools. When the user adds parameters to the shapes, this data may be added and then read during validation and used in conjunction with the diagram connectivity to generate the workflow DML. Parameterization data generated in a visual designer is wrapped in a tag and placed into the User cell. In FIG. 1 the "Do Calculation" action 100 is used to perform calculations such as add, subtract, multiply, or divide two values, and stores the output value in a variable. Thus, there would be a left operand 110, a right operand 120, and an output variable 130.

FIG. 2 lists validation rules 200 for a workflow with stages, loops, and steps according to one embodiment. Validation calls out any connected shapes that are not legal. A workflow with stages, loops, and steps require a new stencil with new shapes and validation rules that address the stage concept 210. New shapes for validation may include stages, loops (number of times), and steps. An example of a validation rule for a workflow with stages as shown in FIG. 2 is "A stage can only be connected to another stage, condition shape, or a terminator" 220. Other workflow shapes to be validated may include: Send an Email, Set Workflow Status, Stop Workflow, Update List Item, and Assign a Form to a Group. The condition shapes may include: Compare Data Store, Compare Data Field, Created By, and Modified by. When diagrams are validated, the activity model may be generated from the diagram connectivity and from the DML fragments in each activity/condition shape. The validation is only for diagram correctness using the rules that may be included in FIG. 2. In order to minimize performance issues, validation may be set to not occur automatically when saving the file. Validation may occur when the user explicitly chooses to validate using a button such as 'Check Diagram' (Process/Diagram Validation), or when the user chooses to open a session in the visual designer software.

Figure 3:
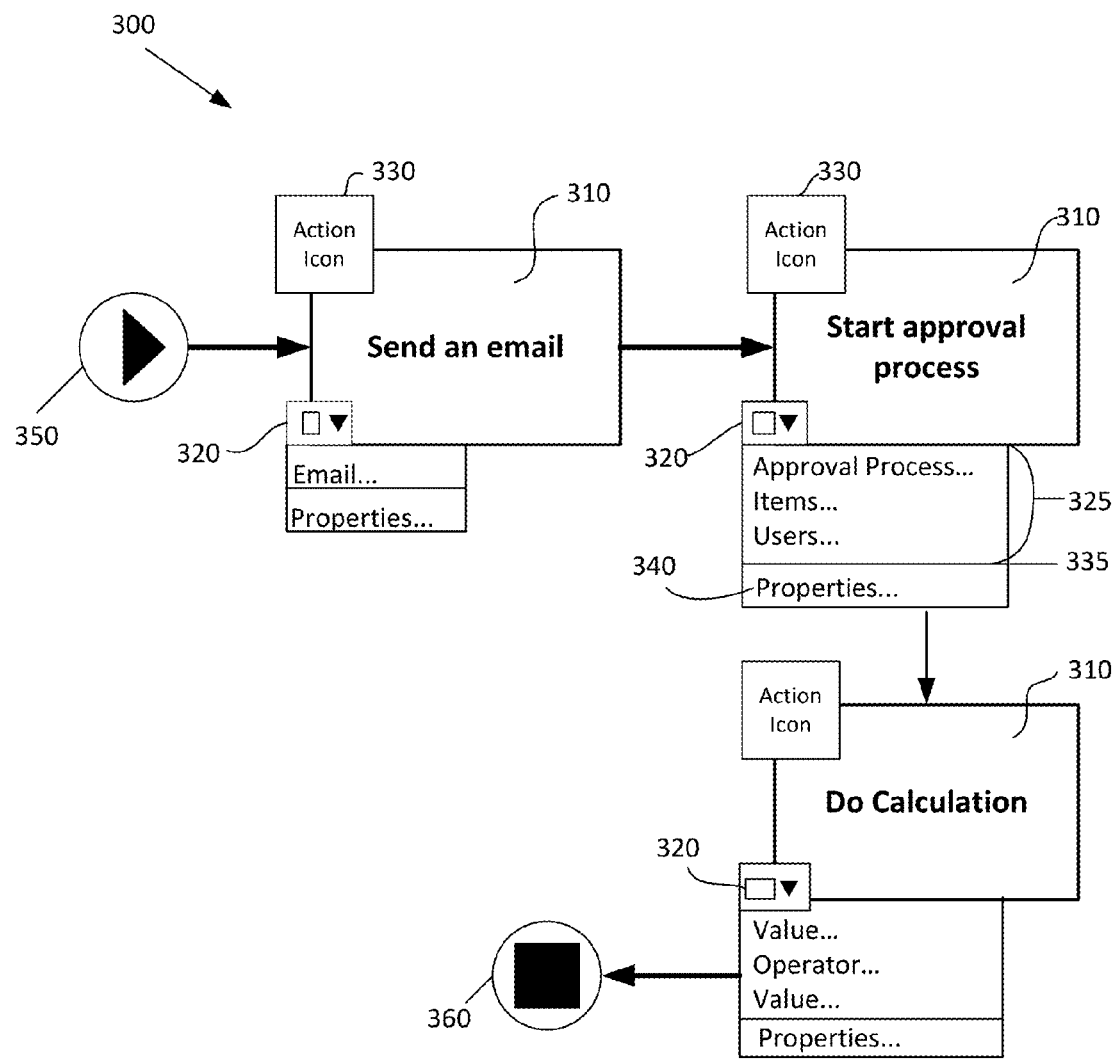
FIG. 3 illustrates three action shapes and their corresponding action tags according to one embodiment.

FIG. 3 illustrates three action shapes and their corresponding action tags 300 according to one embodiment. In a visual designer, the user may be able to add parameterization using action tags. While in a visual designer, the user may edit the properties of the shape 310, represented by its unique icon 330, by selecting an item from the action tags menu 320. Each shape 310 may contain an ActionID or ConditionID in that shape's user cell that identifies the shape 310. A visual designer may look up the activity object in the model, edit its properties, and write the property changes to the shape's 310 user cell. As shown in FIG. 3, every action/conditions shape 310 may have a properties 340 action tag. For example:

Name: "Properties . . . " 340
Action: RunAddonWArgs("QueueMarkerEvent", "/cmd=FieldBind/id=0"

This Properties action tag 340 may be the last entry, after a line 335 separating it from other parameters in the menu 325. Clicking on an action tag 325 and 340 from the menu 320 brings up the side property grid, allowing the user to add/edit values.

Figure 4:
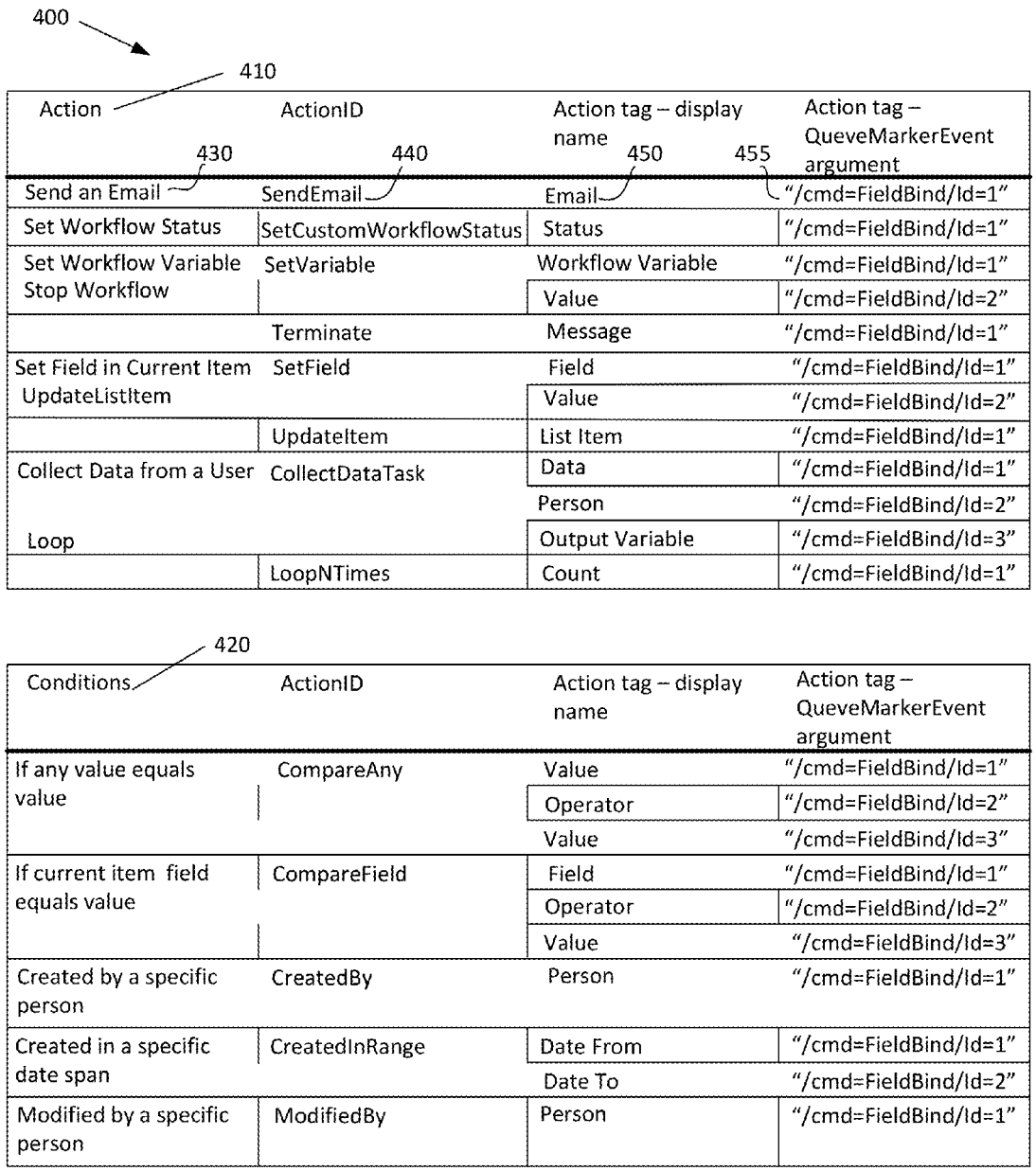
FIG. 4 provides a list of definitions of values of various action tags for both actions and conditions according to one embodiment.

FIG. 4 provides a list of definitions of values of various action tags for both actions and conditions 400 according to one embodiment. For example, in case of "Send an email" action 430, also shown above 310, the shape's ActionID user cell may have "SendEmail" 440 as its value and may have the following action tag:

Display name: "Email" 450
Action: RunAddonWArgs("QueueMarkerEvent", "/cmd=FieldBind/Id=1" 455

These values are included in the list of actions 410. Condition actions tag values are also listed 420.

Figure 5:
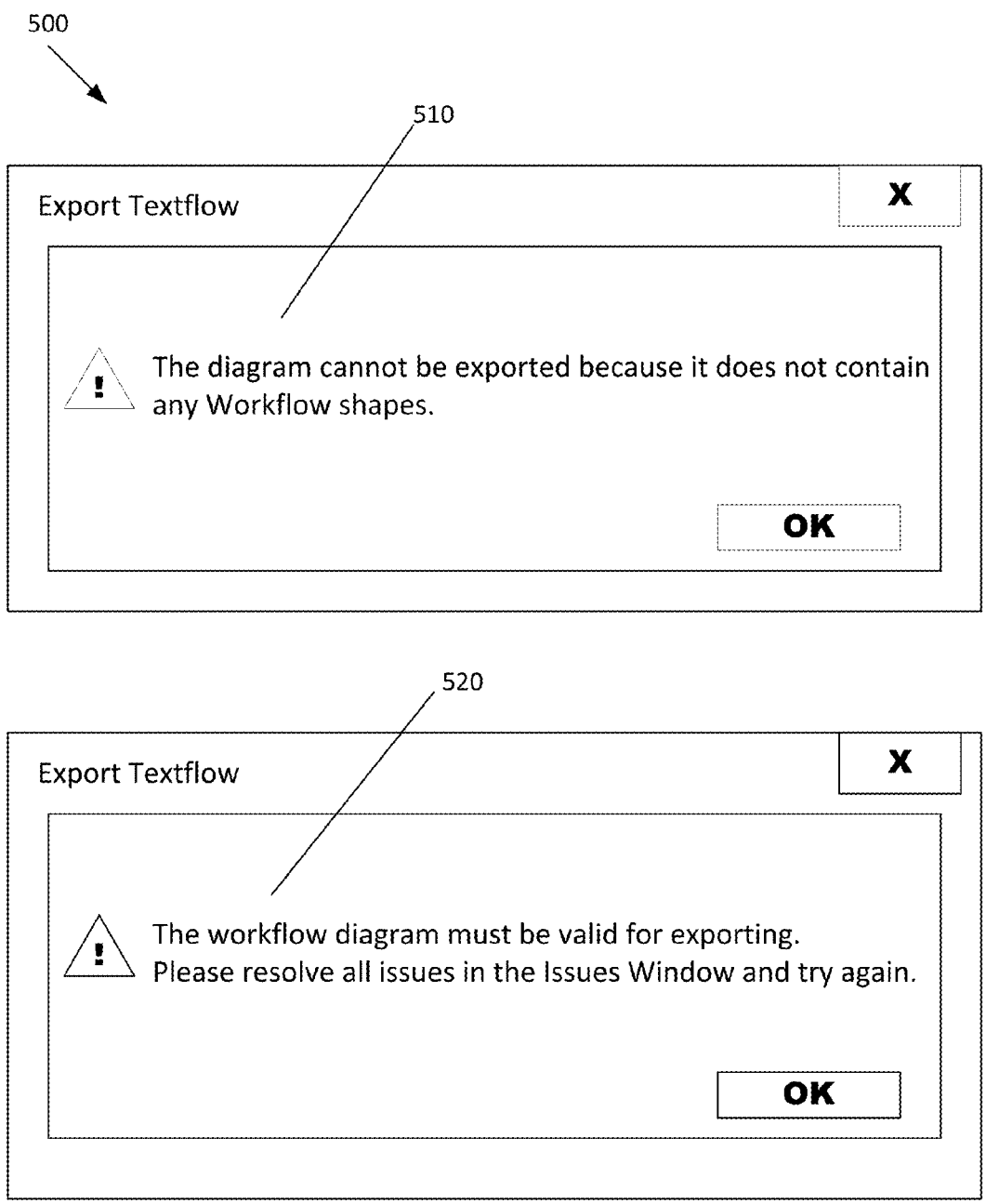
FIG. 5 shows two error dialog screens that may occur when exporting text flow from the diagramming program to the visual designer application platform according to one embodiment.

FIG. 5 shows two error dialog screens that may occur when exporting workflow from the diagramming program to the visual designer application platform 500 according to one embodiment. Either of the two screens 500 may occur when trying to open a session of the diagramming program in the visual designer application platform. For example, an 'Open' button may be added to the process tab of the application platform and this button only exports when the active solution is a workflow solution. If it is not, one of the example error dialog screens 500 may be displayed. The error dialog screen 510 may be displayed when the diagram cannot be exported because it does not contain any Workflow shapes. The error dialog screen 520 may be displayed when the workflow itself is invalid. When the error dialog screen 520 because there are errors at the shape level, the designer can access the shape levels to correct misplaced shapes or connections between shapes. When the errors are at the declarative markup language level, the designer may access the code to reset parameters that were initially set incorrectly. The declarative markup language level error messages may be integrated within the visual designer so the same error pane shows errors that are at the shape level, the declarative markup language level and errors that occur on the server. In addition, the error dialog screen 520 may be used to present the errors to the designer. For example, the error dialog screen 520 may list all the different errors and the designer may select an error from the error dialog screen 520. For example, when the errors are associated with a shape, the error may be selected and the associated shape may be highlighted.

Figure 6:
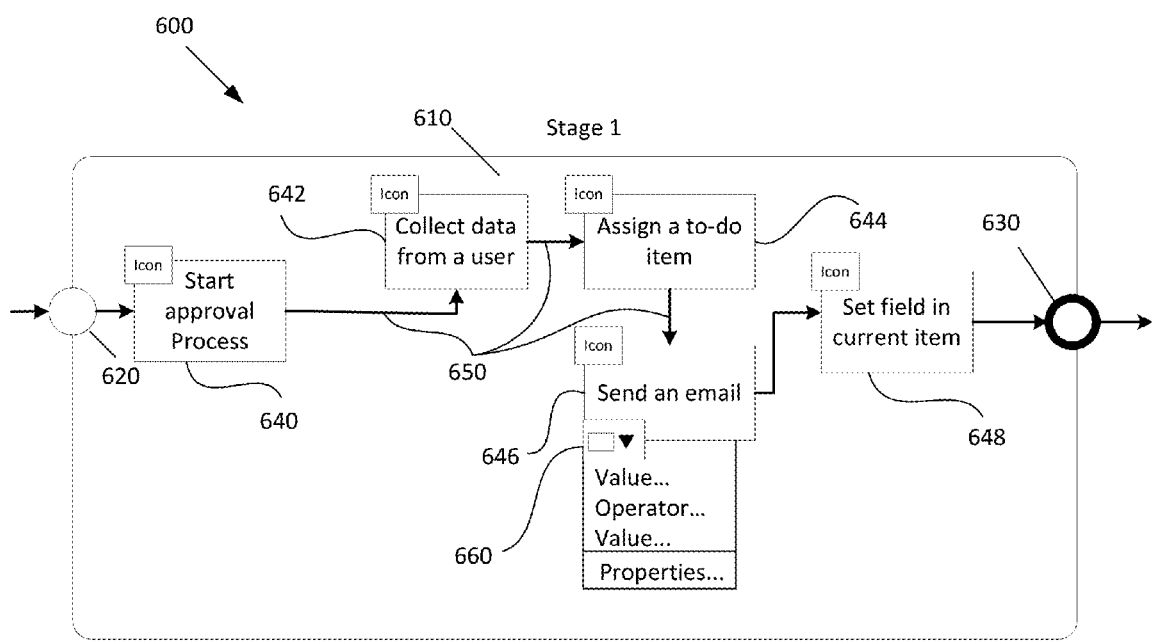
FIG. 6 illustrates a stage according to one embodiment.
Figure 7:
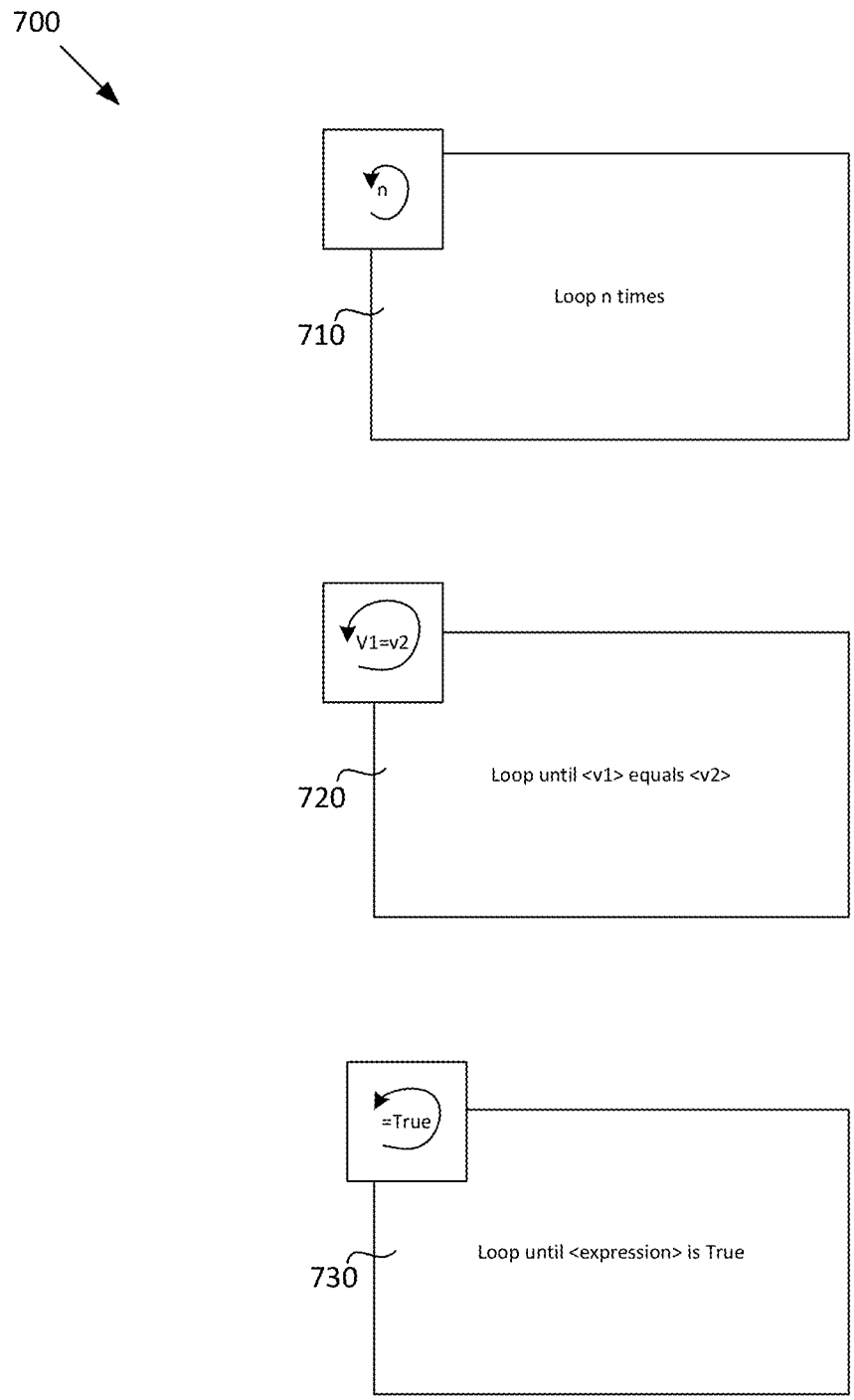
FIG. 7 shows the three loop types that are supported according to one embodiment.
Figure 8:
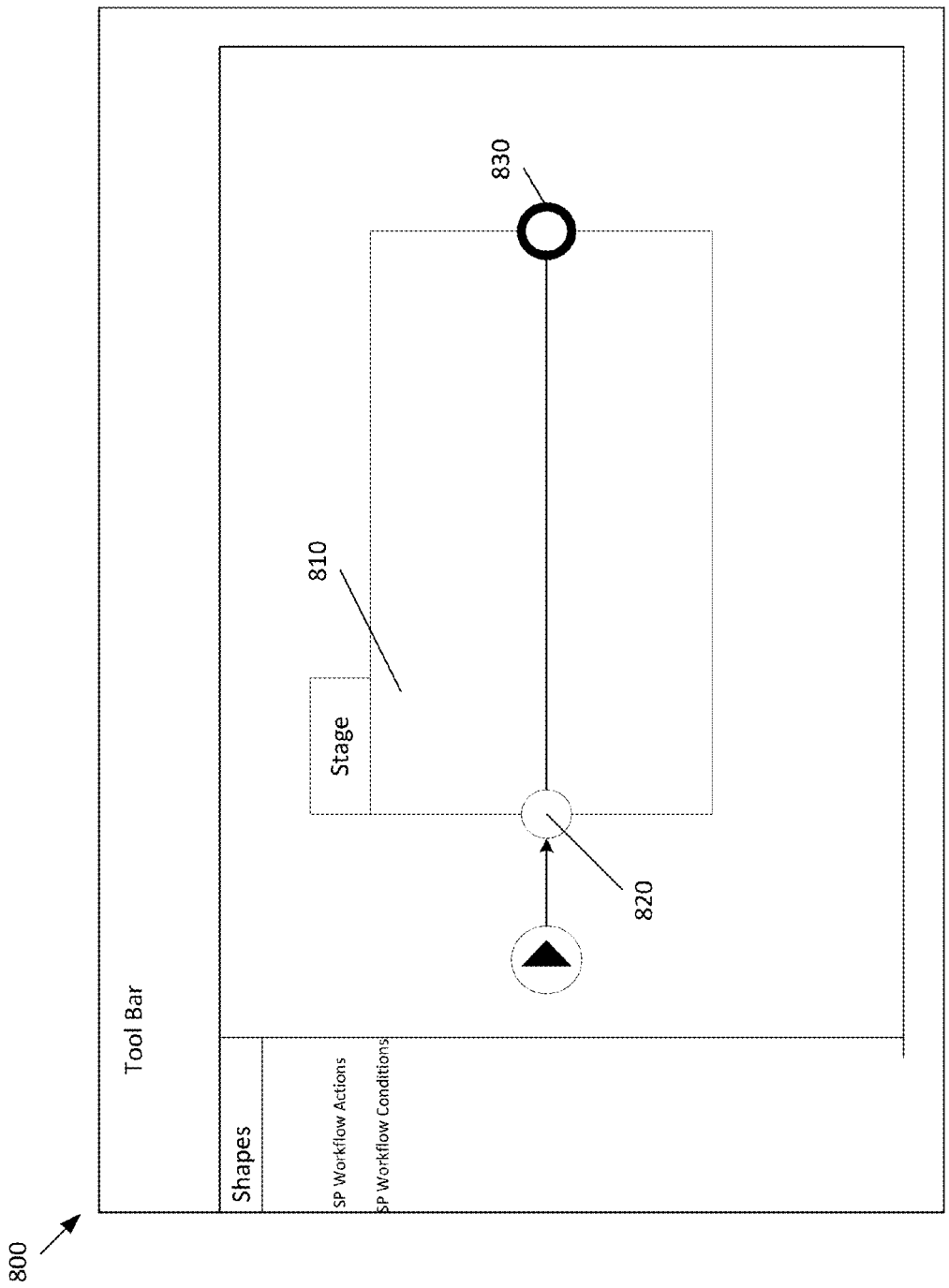
FIG. 8 demonstrates the default container added when there is a new workflow according to one embodiment.

FIGS. 6-8 illustrate the visualization of the workflow. The enhanced workflow allows stages, steps, and loops as logical constructs. This new construct may allow the author to group a number of individual actions and conditions as a single unit in order to more clearly define the process. For instance there could be an Approval or a Request Feedback stage/step. All of the actions necessary would be shown within that stage/step. The stage/step itself might be one node of a longer workflow and would allow a viewer to see the status of that stage as a whole, rather than a set of individual actions. To reflect the different usage of steps versus stages, there may be different shapes with different visual looks to make the distinction between the two more clear. Loops may also be represented by a special container. While loop containers may be standard, rectangular containers, graphic embellishments may be added to distinguish them from stages or steps.

FIG. 6 illustrates a stage of a workflow 600 according to one embodiment. Stages can contain any number of shapes and may include branching. However, there can only be one path into a stage/step and one path out. The stage/step may be visualized using specialized containers 610. Stages may require the shape to be bounded by a Start 620 and End shape 630, thus a single point to exit and enter. In order to avoid validation issues, these are not the same start 350 and end 360 terminators used to mark the beginning and end of a full workflow. Rules for stage containers may include the following:

All diagrams have at least one stage. A stage, complete with terminators for the stage and for the workflow as a whole may be present as part of the default template.

The solution adds Start and End connectors on the drop event for a stage. The default position for the terminators may be with Start on the left, End on the right, each attached to the center attachment point.

Stage containers cannot have any connections into or out of the container other than through the Start/End shapes Stage containers cannot be nested: no stage can contain a stage Loops and branching are allowed within stages, as long as they are contained completely within the stage End and Stop Workflow shapes may exist within a stage An explicit Start shape is required outside of the stage for the entire diagram (a Terminate shape are desirable but not mandatory—the shape may be present by default but can be eliminated to support specific logical constructs, such as loops that only terminate internally.)

Stages are top-level peers: At the top level the workflow can contain only stages and decision shapes. All other connected shapes may be contained within a stage.

From the user's point of view dropping condition shapes may be transparent, since there may only be a single decision shape on the template. The workflow 600 may be created by opening a workflow template in a graphic diagramming tool, such as Visio®. The workflow template provides the shapes and intelligence used to build a workflow by dragging and dropping shapes 640-648 and connectors 650 to the stage 610 on a visual workspace. When the user adds a decision shape the shape with the proper action tags may be added based on whether the shape is added inside a container or between stages. The workflow 600 is saved and published to a web application platform, such as SharePoint®, where it can be modified visually and by the setting of parameters using a web application platform tool, such as SharePoint® Designer. The workflow 600 is maintained using a declarative markup language file. Visualization data from the graphic diagramming tool and parameters and visual modifications made using the web application platform tool are bundled in a single declarative markup language file that is formatted for reading by both the visual graphic diagramming tool and the web application platform tool. Previously, when a file representing the workflow 600 was exported from a web application platform tool to the graphic diagramming tool, at least two, separate files, i.e., a diagram file and a separate file that represents the workflow itself was provided. However, a single declarative markup language file is used by taking all the declarative markup language information embedded into the shapes, storing the declarative markup language information in portions that are placed in each of the shapes. Thus, all the information for a particular shape is associated with that shape.

Once the workflow is provided from the graphic diagramming tool to the web application platform tool, action tags 660 may be used to set desired parameters. The web application platform tool may be used to edit the properties of a shape by selecting an item from the action tags menu 660. The web application platform tool looks up the activity object in the model, edits its properties, and writes the property changes to the shape's user cell.

Steps represent a grouped series of sequential actions. Steps are visually represented identically to stages, but may only exist within a stage. Steps use the same container shape that is used for stages, including Start and End shapes; however the container may be treated as a step if it is contained within a stage.

FIG. 7 show the three loop types that are supported 700 according to one embodiment. Loops are a series of connected shapes which may execute as a loop, returning from the last shape in the series to the first, until a condition is satisfied. Previously, loops in the declarative world were considered either impossible or extremely difficult because there were no built-in actions or activity supporting looping. However, according to an embodiment, loops may be provided using a specialized container. Like stages, the container includes a Start and End shape which may be added on drop. A connector may be added that connects the Start shape to the End shape within the stage container to make it more straightforward to add new shapes that are connected to the internal flow. A loop icon may be added and the heading and coloration may be different from stages and steps. The default title of the loop may be the loop type. The three loop types which may be supported are loop n times 710, loop until <value 1> equals <value 2> 720, and loop until <expression> is True 730. Loops may be within a stage; stages may never be within a loop. Loops may have only one entry and one exit point, and steps may be within a loop. Decision shapes within a loop may be stage-level decisions.

FIG. 8 demonstrates the default container 800 added complete with terminators when there is a new workflow according to one embodiment. All diagrams are required to be constructed entirely of stages, with all shapes within stage containers except for state decision shapes, terminators, and connectors. A workflow template initially contains a stage container 810 in the canvas by default in addition to the workflow Start 820 and End 830 terminators. Shapes may be added anywhere on the canvas, but actions are moved into a stage for the diagram to be valid. Condition shapes may exist outside of stages, but these are used only to determine flow from stage to stage. Validation for stages include the following: all action shapes are inside a stage, only steps may be within stages and may not exist outside of stages, and stage shapes do not overlap in the diagram to avoid issues with ownership of shapes in the stages (see FIG. 2).

Figure 9:
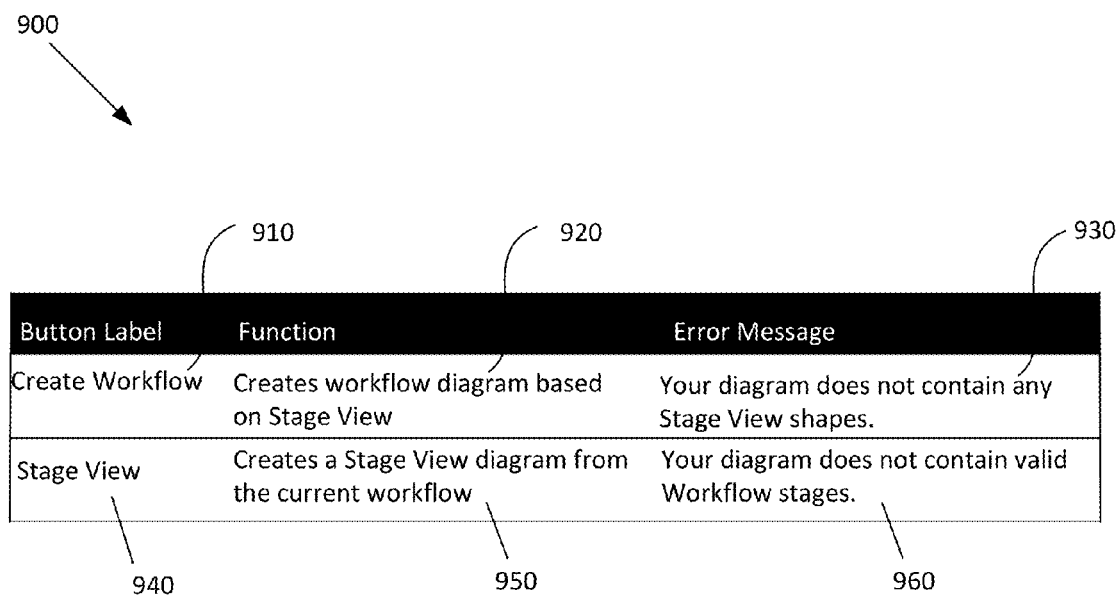
FIG. 9 describes user interface components for the stage view according to one embodiment.

FIGS. 9-10 outline the visualization of a stage view diagram. The stage view allows the user to create a visual model of the diagram which shows only stages as a visualization of a complex workflow. A simplified visualization of the workflow may be created by regenerating the workflow on a new page at the stage-level. Only the stages themselves and stage-level decisions, connectors, and start/end shapes may be drawn during this regeneration. The result is a series of new shapes representing stages and decisions which represent the overview of the workflow. The container name and any custom text from the stage may be preserved in the new shapes. Users may create a diagram using stage view shapes, as well as use a stage view diagram to create a "real" workflow at the stage level.

Stage view needs a stencil which may be added to the workflow template. The stencil has a new shape to represent stages which visually resembles a stage container, but may be formatted to make it easy to distinguish from real stages. This shape is a basic "dumb" shape and not actually a container and does not have action tags associated with it. It may be used to represent a stage and all of the stage's contents on the stage view. The stencil also has a shape for each stage-level condition. Like the stage shape, these shapes may be visually similar to the decisions shapes but have a formatting that allows the user to easily distinguish them from workflow shapes.

FIG. 9 describes a user interface component for the stage view 900 according to one embodiment. The user interface components 900 on the Process tab of the designer workflow application may be visible at all times. The user may choose the create workflow button 910 or the stage view button 940. If the diagram contains no workflow stage containers, the stage view button 940 may produce an error message 960. If a diagram contains no stage view stage shapes, the create workflow button 910 produces the error message 930. When the user the create workflow button 910, a workflow diagram is created based on the stage view 920. When the user chooses the stage view option 940 a brand new diagram on a new page is created.

For example the following steps may happen in order to create this new view 940. First, the shape level validation is run to ensure the diagram is a proper workflow diagram. An "intermediate model" is then generated either from the diagram directly or from the full DML tree. The diagramming program traverses the model and generate the new diagram from scratch adding in shapes only for stages and transitional "if conditions". When adding the shapes to the new canvas, the shapes may be joined in a "left to right" fashion (this may be switched for RTL regions).

Figure 10A:
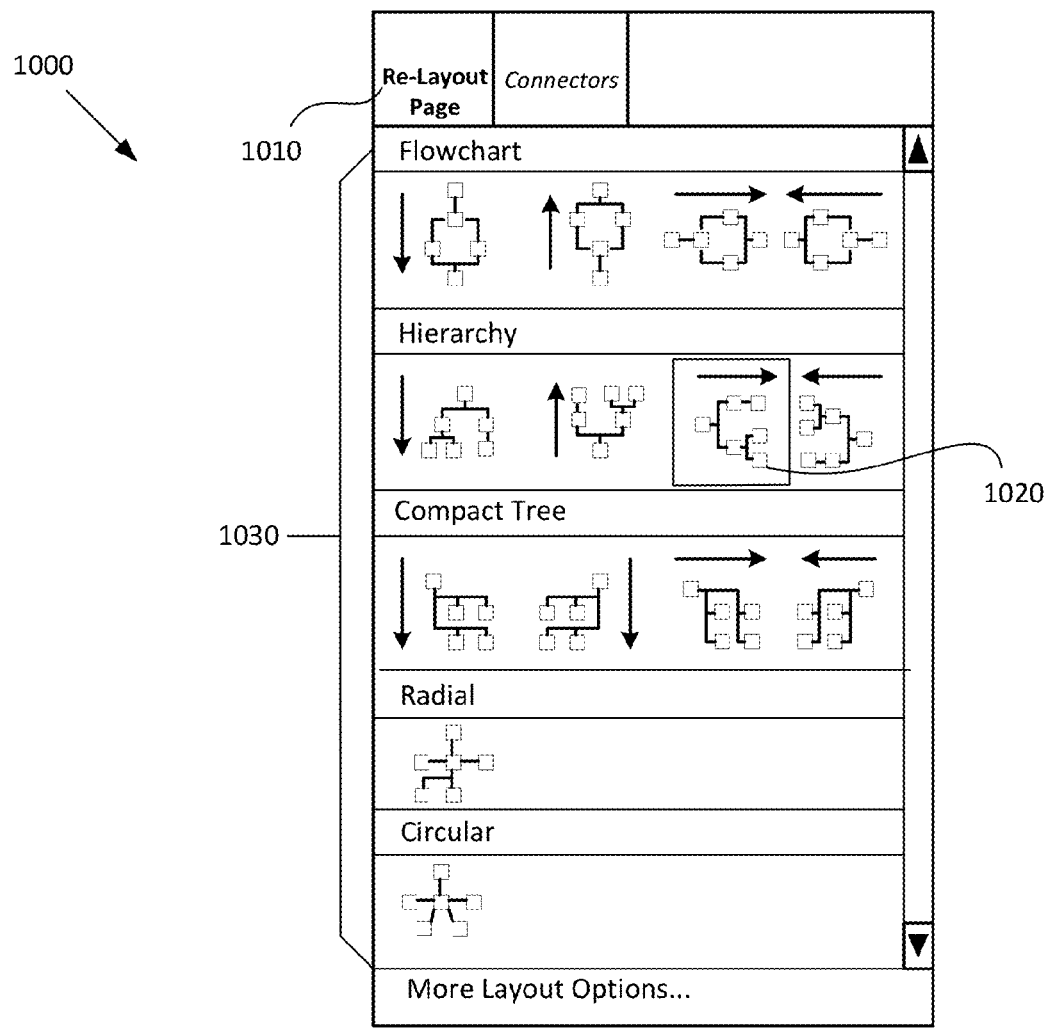
FIGS. 10a-b illustrate the re-layout selection screen of a stage view according to one embodiment.
Figure 10B:
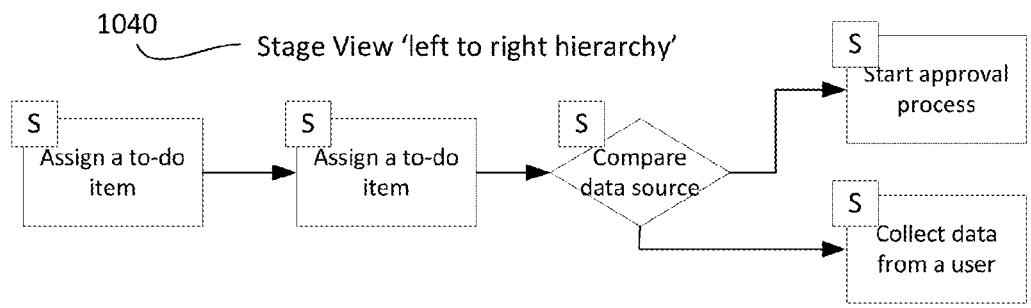

FIGS. 10*a-b* illustrate the re-layout selection screen of a stage view 1000 according to one embodiment. Once the stage view diagram is created as outlined above, the user may choose a re-layout 1010 of the stage view. In FIG. 10*a* the 'left to right hierarchy layout" 1020 is selected from the various re-layout options 1030. FIG. 10*b* illustrates the "left to right hierarchy layout" of a stage view 1040.

All of the stage shapes in the new stage view may be hyper-linked to the original stage shapes within the original workflow diagram. This means that a user is able to scan the stage level diagram, and then click on any stage to drill into further details. This behavior may be preserved on the server visualization as well. The visualization webpart has the ability to view the new stage view and interact with it properly.

Figure 11:
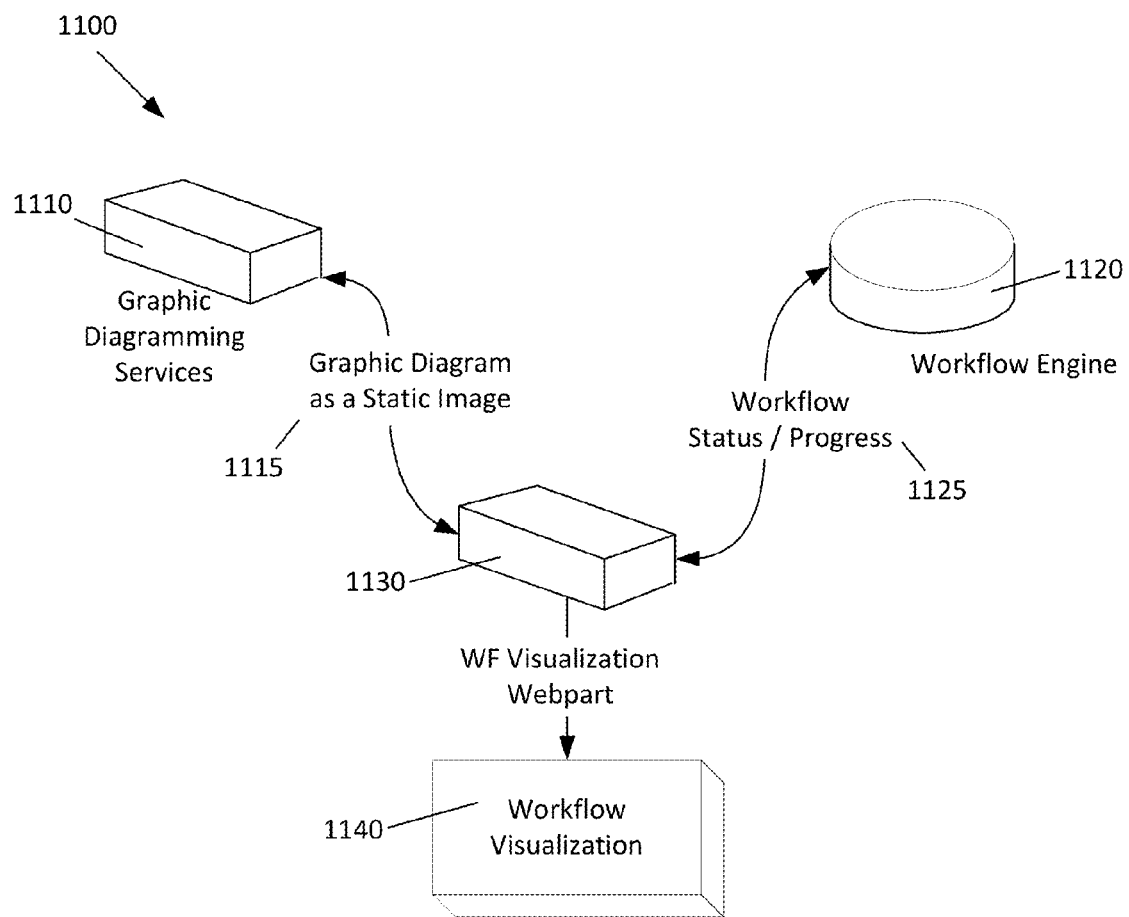
FIG. 11 illustrates the high level architecture of how visualization works according to one embodiment.

FIG. 11 illustrates the high level architecture of how visualization works 1100 according to one embodiment. The workflow process is a series of tasks or actions, the order in which the tasks are performed, permissions defining who can perform them, and script that is executed for each action. In order to provide real time visibility into workflow projects and requests 1140, the WF Visualization Webpart 1130 pulls in the workflow diagram 1115 directly from the diagramming program 1110 and the workflow status information 1125 from the Workflow engine 1120. The workflow engine 1120 is a component in the designer infrastructure that makes workflow possible. The workflow engine 1120 is used to enforce the workflow definition and execute workflow actions. It facilitates the flow of information, tasks and events, thus monitoring status and progress 1125. The workflow visualization 1140 shows a "live" view that indicates which stage the workflow is currently at. Thus, it empowers business users and IT professionals alike to easily automate business processes.

Figure 12:
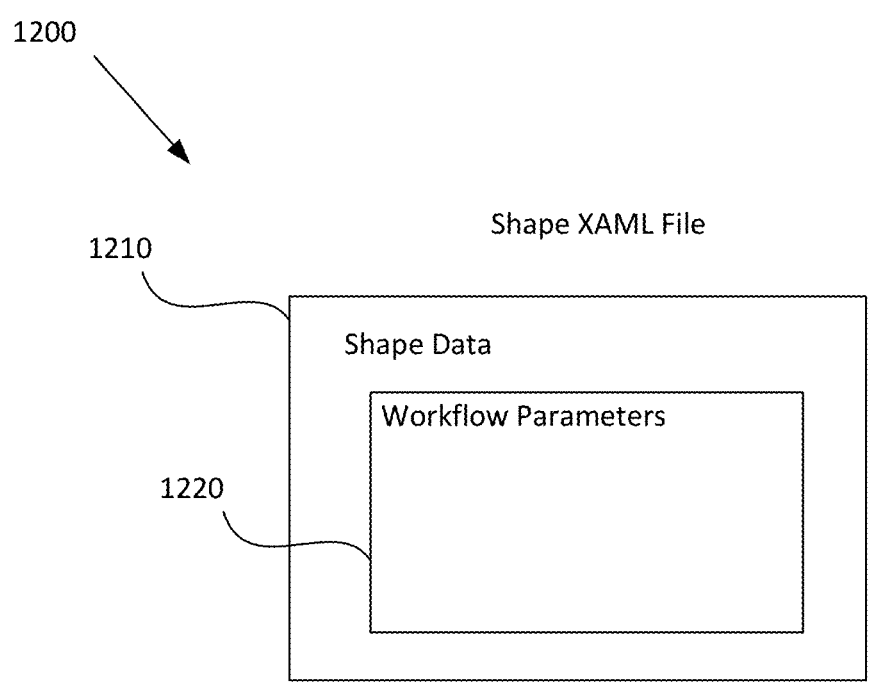
FIG. 12 illustrates a declarative markup language file for a shape according to one embodiment.

FIG. 12 illustrates a declarative markup language file for a shape 1200 according to one embodiment. In the declarative markup language file 1200, shape data 1210 and workflow parameters 1220 are provided. Visualization data 1210 from the graphic diagramming tool and parameters and visual modifications 1220 made using the web application platform tool are bundled in the single declarative markup language file 1200 and formatted for reading by both the visual graphic diagramming tool and the web application platform tool. Thus, a single declarative markup language file 1200 is used by embedding all declarative markup language information into a shape by storing the shape data 1210 in the declarative markup language file 1200 and then separating workflow parameters 1220 into portions that are placed in each of the shapes.

Figure 13:
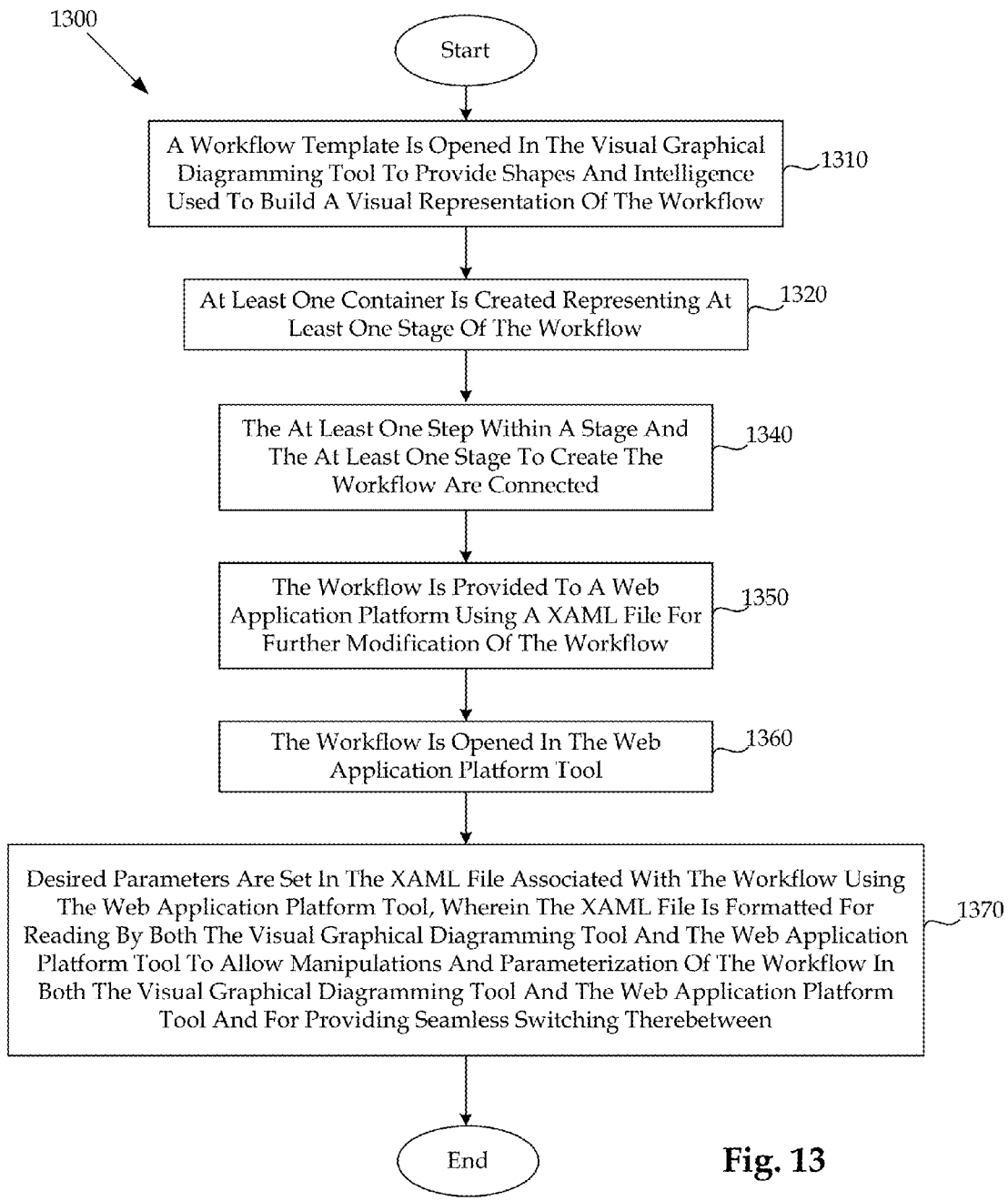
FIG. 13 is a flowchart of a method for providing integrated workflow visualization and editing according to an embodiment.

FIG. 13 is a flowchart 1300 of a method for providing integrated workflow visualization and editing according to an embodiment. In FIG. 13, a workflow template is opened in the visual graphic diagramming tool to provide shapes and intelligence used to build a visual representation of the workflow 1310. At least one container is created representing at least one stage of the workflow 1320. Optionally, at least one step to be performed may be provided in the at least one stage. The at least one step within a stage and the at least one stage to create the workflow are connected 1340. The workflow is provided to a web application platform using a declarative markup language file for further modification of the workflow 1350. The workflow is opened in the web application platform tool 1360. Desired parameters are set in the declarative markup language file associated with the workflow using the web application platform tool, wherein the declarative markup language file is formatted for reading by both the visual graphic diagramming tool and the web application platform tool to allow manipulations and parameterization of the workflow in both the visual graphic diagramming tool and the web application platform tool and for providing seamless switching therebetween 1370.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 14-17 and the associated descriptions provide a discussion of a variety of operating environments in which embodiments may be practiced. However, the devices and systems illustrated and discussed with respect to FIGS. 14-17 are for purposes of example and illustration and are not limiting of a vast number of computing device configurations that may be utilized for practicing embodiments, described herein.

Figure 14:
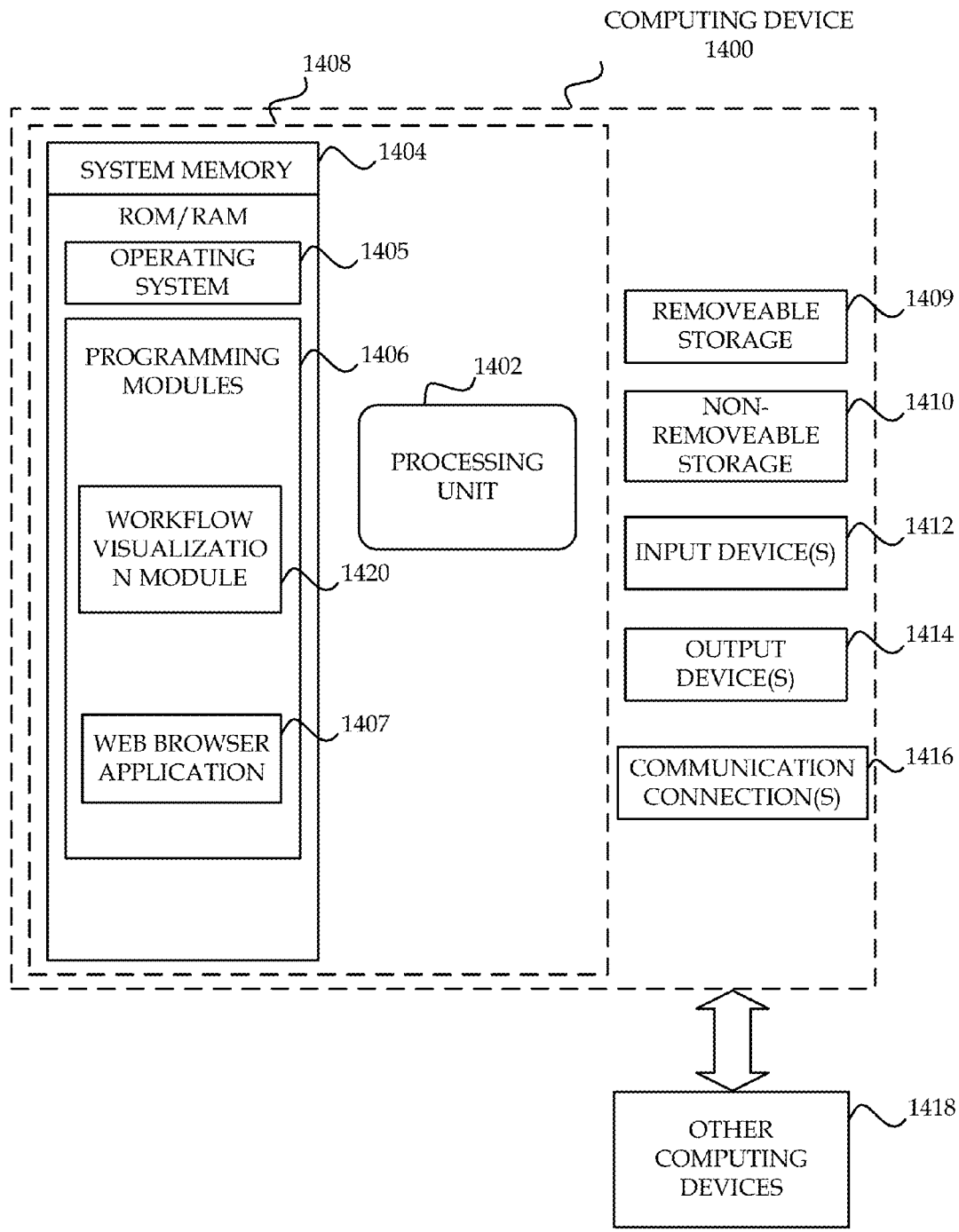
FIG. 14 is a simplified block diagram of a computing device with which embodiments of the present invention may be practiced.

FIG. 14 is a block diagram illustrating example physical components of a computing device 1400 with which embodiments may be practiced. In a basic configuration, computing device 1400 may include at least one processing unit 1402 and a system memory 1404. Depending on the configuration and type of computing device, system memory 1404 may comprise, but is not limited to, volatile (e.g. random access memory (RAM)), non-volatile (e.g. read-only memory (ROM)), flash memory, or any combination. System memory 1404 may include operating system 1405, one or more programming modules 1406, and may include the workflow visualization module 1420 for providing workflow visualization and editing. Operating system 1405, for example, may be suitable for controlling the operation of computing device 1400. Furthermore, embodiments may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410.

As stated above, a number of program modules and data files may be stored in system memory 1404, including operating system 1405. While executing on processing unit 1402, programming modules 1406, such as the workflow visualization module 1420, may perform processes including, for example, one or more of the processes described above with reference to FIGS. 1-13. The aforementioned processes are an example, and processing unit 1402 may perform other processes. Other programming modules that may be used in accordance with embodiments may include electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the workflow visualization module 1420 may be operated via application-specific logic integrated with other components of the computing device/system 1400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium. The computer program product may be a computer-readable storage medium readable by a computer system and encoding a computer program of instructions for executing a computer process.

The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, etc. Output device(s) 1414 such as a display, speakers, a printer, etc. may also be included. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 15A:
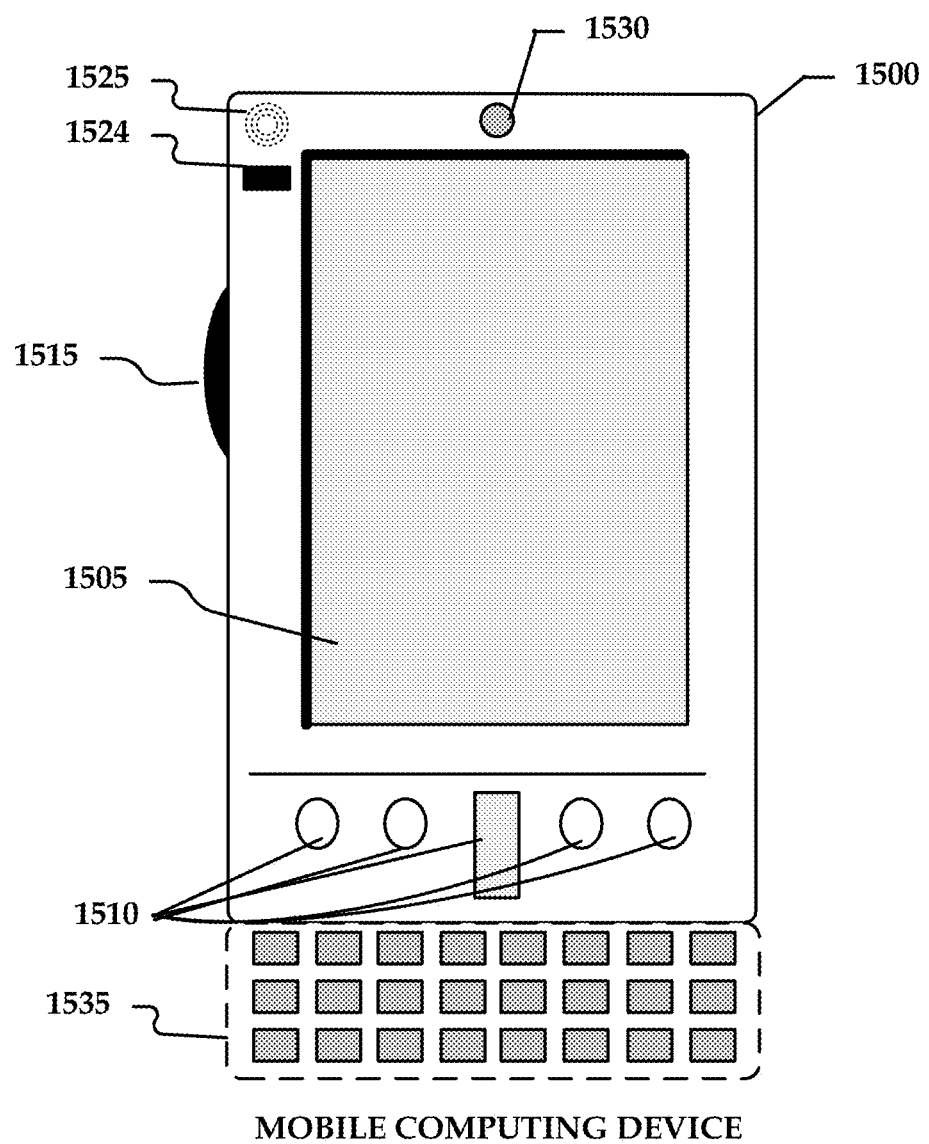
FIGS. 15a-b are simplified block diagrams of a mobile computing device with which embodiments of the present invention may be practiced.
Figure 15B:
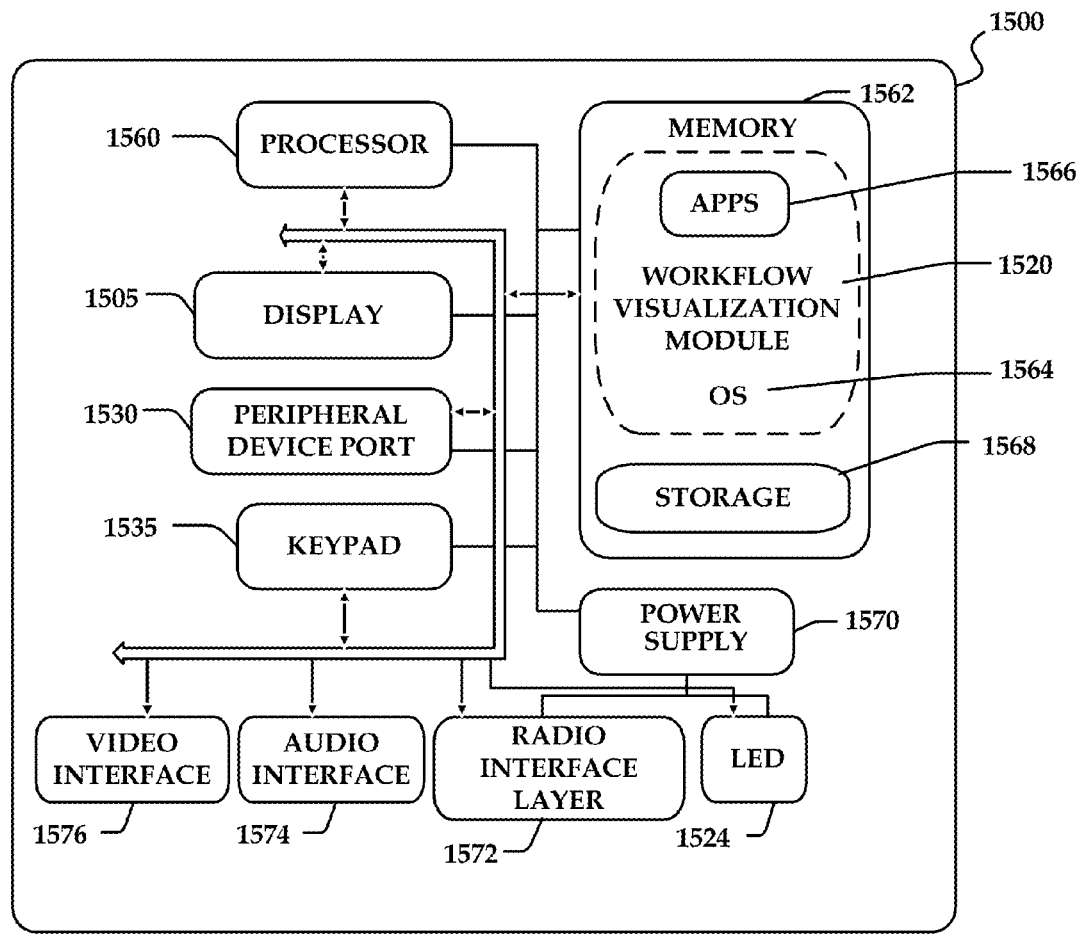

FIGS. 15*a*-*b* illustrate a suitable mobile computing environment, for example, a mobile telephone 1500, a smart phone, a tablet personal computer, a laptop computer, and the like, with which embodiments may be practiced. With reference to FIG. 15*a*, an example mobile computing device 1500 for implementing the embodiments is illustrated. In a basic configuration, mobile computing device 1500 is a handheld computer having both input elements and output elements. Input elements may include touch screen display 1505 and input buttons 1515 that allow the user to enter information into mobile computing device 1500. Mobile computing device 1500 may also incorporate an optional side input element 1515 allowing further user input. Optional side input element 1515 may be a rotary switch, a button, or any other type of manual input element. In alternative embodiments, mobile computing device 1500 may incorporate more or less input elements. For example, display 1505 may not be a touch screen in some embodiments. In yet another alternative embodiment, the mobile computing device is a portable phone system, such as a cellular phone having display 1505 and input buttons 1515. Mobile computing device 1500 may also include an optional keypad 1535. Optional keypad 1515 may be a physical keypad or a "soft" keypad generated on the touch screen display.

Mobile computing device 1500 incorporates output elements, such as display 1505, which can display a graphical user interface (GUI). Other output elements include speaker 1525 and LED light 1524. Additionally, mobile computing device 1500 may incorporate a vibration module (not shown), which causes mobile computing device 1500 to vibrate to notify the user of an event. In yet another embodiment, mobile computing device 1500 may incorporate a headphone jack (not shown) for providing another means of providing output signals.

Although described herein in combination with mobile computing device 1500, alternative embodiments may be used in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

FIG. 15*b* is a block diagram illustrating components of a mobile computing device used in one embodiment, such as the computing device shown in FIG. 15*a*. That is, mobile computing device 1500 can incorporate system 1502 to implement some embodiments. For example, system 1502 can be used in implementing a "smart phone" that can run one or more applications similar to those of a desktop or notebook computer such as, for example, browser, e-mail, scheduling, instant messaging, and media player applications. In some embodiments, system 1502 is integrated as a computing device, such as an integrated personal digital assistant (PDA) and wireless phone.

One or more application programs 1566 may be loaded into memory 1562 and run on or in association with operating system 1564. Examples of application programs include phone dialer programs, e-mail programs, PIM (personal information management) programs, word processing programs, spreadsheet programs, Internet browser programs, messaging programs, and so forth. System 1502 also includes non-volatile storage 1568 within memory 1562. Non-volatile storage 1568 may be used to store persistent information that should not be lost if system 1502 is powered down. Applications 1566 may use and store information in non-volatile storage 1568, such as e-mail or other messages used by an e-mail application, and the like. A synchronization application (not shown) also resides on system 1502 and is programmed to interact with a corresponding synchronization application resident on a host computer to keep the information stored in non-volatile storage 1568 synchronized with corresponding information stored at the host computer. As should be appreciated, other applications may be loaded into memory 1562 and run on the device 1500, including the workflow visualization module 1520, described herein.

System 1502 has a power supply 1570, which may be implemented as one or more batteries. Power supply 1570 might further include an external power source, such as an AC adapter or a powered docking cradle that supplements or recharges the batteries.

System 1502 may also include a radio 1572 that performs the function of transmitting and receiving radio frequency communications. Radio 1572 facilitates wireless connectivity between system 1502 and the "outside world", via a communications carrier or service provider. Transmissions to and from radio 1572 are conducted under control of OS 1564. In other words, communications received by radio 1572 may be disseminated to application programs 1566 via OS 1564, and vice versa.

Radio 1572 allows system 1502 to communicate with other computing devices, such as over a network. Radio 1572 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

This embodiment of system 1502 is shown with two types of notification output devices; LED 1524 that can be used to provide visual notifications and an audio interface 1574 that can be used with speaker 1525 to provide audio notifications. These devices may be directly coupled to power supply 1570 so that when activated, they remain on for a duration dictated by the notification mechanism even though processor 1560 and other components might shut down for conserving battery power. LED 1524 may be programmed to remain on indefinitely until the user takes action to indicate the powered-on status of the device. Audio interface 1574 is used to provide audible signals to and receive audible signals from the user. For example, in addition to being coupled to speaker 1525, audio interface 1574 may also be coupled to a microphone to receive audible input, such as to facilitate a telephone conversation. In accordance with embodiments, the microphone 1524 may also serve as an audio sensor to facilitate control of notifications, as will be described below. System 1502 may further include video interface 1576 that enables an operation of on-board camera 1530 to record still images, video stream, and the like.

A mobile computing device implementing system 1502 may have additional features or functionality. For example, the device may also include additional data storage devices (removable and/or non-removable) such as, magnetic disks, optical disks, or tape. Such additional storage is illustrated in FIG. 15*b* by storage 1568. Computer-readable storage media may include volatile and nonvolatile, removable and non-removable media implemented in any method or technology for storage of information, such as computer-readable instructions, data structures, program modules, or other data.

Data/information generated or captured by the device 1500 and stored via the system 1502 may be stored locally on the device 1500, as described above, or the data may be stored on any number of storage media that may be accessed by the device via the radio 1572 or via a wired connection between the device 1500 and a separate computing device associated with the device 1500, for example, a server computer in a distributed computing network, such as the Internet. As should be appreciated such data/information may be accessed via the device 1500 via the radio 1572 or via a distributed computing network. Similarly, such data/information may be readily transferred between computing devices for storage and use according to well-known data/information transfer and storage means, including electronic mail and collaborative data/information sharing systems.

Figure 16:
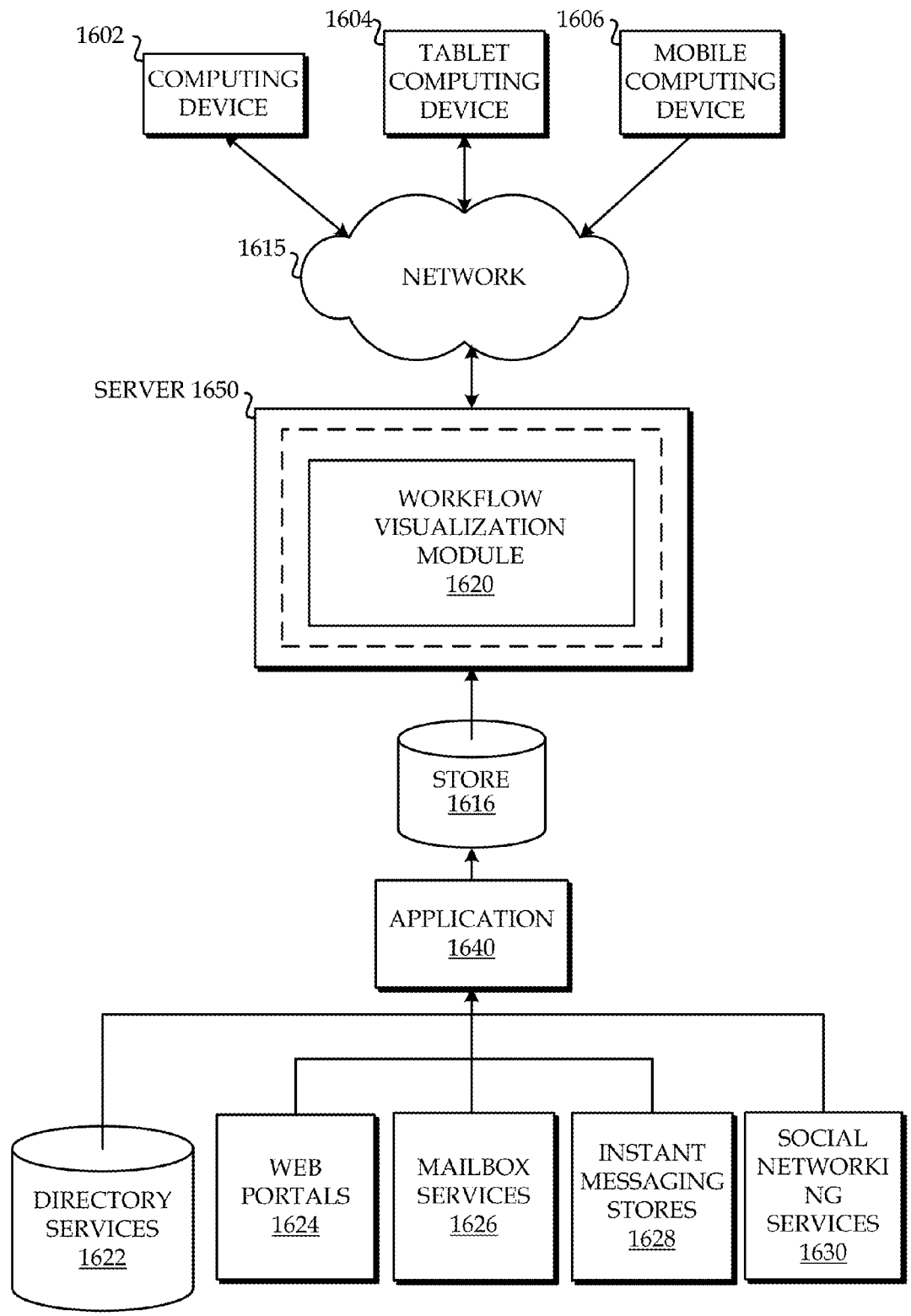
FIG. 16 is a simplified block diagram of a distributed computing system in which embodiments of the present invention may be practiced.

FIG. 16 illustrates a system architecture for providing workflow to/via to one or more client devices, as described above. Workflows developed, interacted with or edited in association with a workflow visualization module 1620 may be stored in different communication channels or other storage types. For example, workflows along with information from which they are developed may be stored using directory services 1622, web portals 1624, mailbox services 1626, instant messaging stores 1628 and social networking sites 1630 and accessed by application 1640. The workflow visualization module 1620 may use any of these types of systems or the like for enabling data utilization, as described herein. A server 1650 may provide the workflows to clients. As one example, server 1650 may be a web server providing workflows over the web. Server 1650 may provide workflows over the web to clients through a network 1615. Examples of clients that may obtain workflows include computing device 1602, which may include any general purpose personal computer, a tablet computing device 1604 and/or mobile computing device 1606, such as smart phones. Any of these devices may obtain content from the store 1616.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-13. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

It will be apparent to those skilled in the art that various modifications or variations may be made to embodiments without departing from the scope or spirit. Other embodiments are apparent to those skilled in the art from consideration of the specification and practice of the embodiments disclosed herein.

What is claimed is:

1. A method for providing integrated workflow visualization and editing, comprising:
opening a workflow template in a visual graphic diagramming tool to provide shapes and intelligence used to build a visual representation of a workflow;

creating at least one stage container in the visual graphic diagramming tool, the at least one stage container containing at least one action step, and wherein the at least one stage container is encoded in a declarative markup language file formatted for reading in the visual graphic diagramming tool and a web application platform tool, and wherein the declarative markup language is embedded into at least one of: a state decision shape, an action shape, a condition shape, a terminator shape, and a connector;

setting parameters in the declarative markup language file and switching between the visual graphic diagramming tool and the web application platform tool whereby manipulations and parameterization of the workflow can be performed in both the visual graphic diagramming tool and the web application platform tool;

exporting the workflow to a web application platform from the visual graphic diagramming tool;

validating the workflow for diagram correctness including:
  ensuring all action shapes and condition shapes are inside a stage except for state decision shapes, terminator shapes, and connectors;
  ensuring all action steps are inside stages;
  ensuring stage shapes are not overlapping in the diagram; and
  modifying the declarative markup language file for the workflow in the web application platform tool and creating an executable workflow.

2. The method of claim 1 further comprising publishing the workflow on a server using the web application platform tool and validating that the workflow is executable.

3. The method of claim 1, wherein the using the visual graphic diagramming tool to create a workflow further comprises dragging and dropping elements for creating the workflow.

4. The method of claim 1, wherein opening the workflow template to provide shapes and intelligence used to build the workflow comprises creating at least one container representing at least one stage of the workflow, generating, in the at least one stage, at least one step to be performed and providing an action tag for providing a drop down list to configure desired parameters to implement an actual working workflow and wherein the opening the workflow in the visual view of the web application platform tool comprises providing drop down boxes for setting the parameters for each action.

5. The method of claim 1, wherein the creating at least one container comprises providing the container within the visual graphic diagramming tool and at a lower level within the web application platform tool.

6. The method of claim 1, wherein the publishing the workflow using the web application platform tool comprises creating a declarative markup language file by traversing the workflow to collect all declarative markup language data for the workflow.

7. The method of claim 1, wherein the validating that the workflow is executable comprises verifying valid arrangement of shapes using predetermined rules and accessing the at least one shape to correct misplacements or connections between the at least one shape.

8. The method of claim 1, wherein validating the workflow for diagram correctness further comprises processing a request to validate the workflow.

9. A system for providing integrated workflow visualization and editing, comprising:
  a visual graphic diagramming tool for creating a visual representation of a workflow, wherein: a workflow template is opened in the visual graphic diagramming tool to provide shapes and intelligence used to build a visual representation of the workflow, at least one container representing at least one stage of the workflow is created, and the at least one stage is used to produce the workflow; and
  a web application platform tool, operatively coupled to the visual graphic diagramming tool, to modify the workflow created with the visual graphic diagramming tool, wherein the web application platform tool receives the workflow as a declarative markup language file from the visual graphic diagramming tool for further modification of the workflow, and wherein the web application platform tool opens the workflow and sets desired parameters to create an executable workflow, and wherein declarative markup language is embedded into at least one of: a state decision shape, an action shape, a condition shape, a terminator shape, and a connector;
  wherein visualization data from the graphic diagramming tool and the set parameters are bundled in a single declarative markup language file formatted for reading by both the visual graphic diagramming tool and the web application platform tool for switching between the visual graphic diagramming tool and the web application platform tool whereby manipulations and parameterization of the workflow can be performed in both the visual graphic diagramming tool and the web application platform tool; and
  wherein manipulations and parameterization of the workflow are validated for diagram correctness, including:
    ensuring all action shapes and condition shapes are inside a stage except for state decision shapes, terminators, and connectors;
    ensuring all action steps are inside stages; and
    ensuring stage shapes are not overlapping in the diagram.

10. The system of claim 9, wherein the web application platform tool publishes workflow on a server and validates that the workflow is executable.

11. The system of claim 9, wherein the visual graphic diagramming tool and the web application platform tool pass the workflow file therebetween to transition between a visual view of the visual graphic diagramming tool and a visual view in the web application platform tool based on the use of the declarative markup language file for representing the workflow.

12. The system of claim 9, wherein the visual graphic diagramming tool creates a workflow by providing for the dragging and dropping of elements to a visual workspace for creating the workflow.

13. The system of claim 9, wherein the at least one container representing at least one stage of the workflow is provided and in the at least one stage, at least one step to be performed is added, and wherein the web application platform tool provides an action tag for providing a drop down list to configure desired parameters to implement the workflow.

14. The system of claim 9, wherein the web application platform tool traverses the workflow to collect all declarative markup language data for the workflow.

15. The system of claim 9, wherein the visual graphic diagramming tool validates that the workflow is executable by verifying valid arrangement of shapes using predetermined rules and enabling the at least one shape to be accessed to correct misplacements or connections between the at least one shape.

16. A computer-readable storage medium including executable instructions which, when executed by a processor, provides integrated workflow visualization and editing, by:

opening a workflow template in a visual graphic diagramming tool to provide shapes and intelligence used to build a visual representation of a workflow;

creating at least one stage container in the visual graphic diagramming tool, the at least one stage container containing at least one action step, and wherein the at least one stage container is encoded in a declarative markup language file formatted for reading in the visual graphic diagramming tool and a web application platform tool, and wherein declarative markup language is embedded into at least one of: a state decision shape, an action shape, a condition shape, a terminator shape, and a connector;

setting parameters in the declarative markup language file and switching between the visual graphic diagramming tool and the web application platform tool whereby manipulations and parameterization of the workflow can be performed in both the visual graphic diagramming tool and the web application platform tool;

exporting the workflow to the web application platform from the visual graphic diagramming tool;

validating the workflow for diagram correctness including:
ensuring all action shapes and condition shapes are inside a stage except for state decision shapes, terminator shapes, and connectors;
ensuring all action steps are inside stages;
ensuring stage shapes are not overlapping in the diagram; and
modifying the declarative markup language file for the workflow in the web application platform tool and creating an executable workflow.

17. The computer-readable storage medium of claim 16 further comprising publishing the workflow on a server using the web application platform tool and validating that the workflow is executable.

18. The computer-readable storage medium of claim 16, wherein opening the workflow template to provide shapes and intelligence used to build the workflow comprises creating at least one container representing at least one stage of the workflow, generating, in the at least one stage, at least one step to be performed and providing an action tag for providing a drop down list to configure desired parameters to implement an actual working workflow and wherein the opening the workflow in the visual view of the web application platform tool comprises providing drop down boxes for setting the parameters for each action.

19. The computer-readable storage medium of claim 16, wherein the validating that the workflow is executable comprises verifying valid arrangement of shapes using predetermined rules and accessing the at least one shape to correct misplacements or connections between the at least one shape.

20. The computer-readable storage medium of claim 16, wherein validating the workflow for diagram correctness further comprises processing a request to validate the workflow.

* * * * *